(12) United States Patent
Yannam et al.

(10) Patent No.: US 11,144,846 B1
(45) Date of Patent: Oct. 12, 2021

(54) COMPLEX HUMAN-COMPUTER INTERACTIONS

(71) Applicant: Bank of America Corporation, Charlotte, NC (US)

(72) Inventors: Ramakrishna R. Yannam, The Colony, TX (US); Ashwini Patil, Richardson, TX (US); Priyank R. Shah, Plano, TX (US); Ravisha Andar, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 35 days.

(21) Appl. No.: 16/874,930

(22) Filed: May 15, 2020

(51) Int. Cl.
| | |
|---|---|
| H04L 12/18 | (2006.01) |
| G06N 20/00 | (2019.01) |
| H04L 12/58 | (2006.01) |
| H04L 29/06 | (2006.01) |
| H04L 12/24 | (2006.01) |

(52) U.S. Cl.
CPC ......... *G06N 20/00* (2019.01); *H04L 12/1813* (2013.01); *H04L 51/04* (2013.01); *H04L 51/046* (2013.01); *H04L 51/16* (2013.01); *H04L 65/1069* (2013.01); *H04L 41/5093* (2013.01)

(58) Field of Classification Search
CPC .......... G06N 20/00; G06N 3/04; G06N 5/003; H04L 12/1813; H04L 41/5093; H04L 51/04; H04L 51/046; H04L 51/16; H04L 51/02; H04L 65/1069; H04L 67/306; G06F 16/285; G06F 16/953; G06F 40/216; G06Q 30/01; H04M 3/5175; H04M 3/5183; H04M 3/5191
See application file for complete search history.

(56) References Cited

U.S. PATENT DOCUMENTS

| | | | |
|---|---|---|---|
| 2009/0245500 A1* | 10/2009 | Wampler | H04M 3/5191 |
| | | | 379/265.09 |
| 2017/0024640 A1* | 1/2017 | Deng | G06N 3/04 |
| 2019/0052616 A1* | 2/2019 | Campbell | H04L 67/306 |
| 2019/0245975 A1* | 8/2019 | Konig | H04M 3/5175 |
| 2019/0311036 A1* | 10/2019 | Shanmugam | G06N 5/003 |
| 2020/0106881 A1* | 4/2020 | Beaver | H04M 3/5183 |
| 2020/0184278 A1* | 6/2020 | Zadeh | G06F 16/953 |
| 2020/0311738 A1* | 10/2020 | Gupta | G06F 16/285 |

(Continued)

*Primary Examiner* — Le H Luu
(74) *Attorney, Agent, or Firm* — Weiss & Arons LLP; Michael A. Springs, Esq.

(57) ABSTRACT

Methods for leveraging a plurality of machine-learning algorithms to improve a chat interaction are provided. The methods may include monitoring for initiation of a live chat session; alerting and assigning a chat responder to the live chat session; engaging one or more of a plurality of automated chat tools, the tools loaded with artificial intelligence (AI), in order to improve the response of the responder during the session; reviewing and retrieving, using the AI, from a machine learning (ML) library in electronic communication with the AI, historical information; presenting, on a chat responder screen, selected actionable information generated based on the historical information, to the responder; integrating, based on pre-determined conditions, chat responses into the ML library; and integrating into the ML library, based on the same or other pre-determined conditions, chat comments. The chat comments are generated by a chat initiator.

21 Claims, 5 Drawing Sheets

(56) References Cited

U.S. PATENT DOCUMENTS

| | | | |
|---|---|---|---|
| 2021/0144107 A1* | 5/2021 | Liang | G06F 40/216 |
| 2021/0152496 A1* | 5/2021 | Kim | H04L 51/02 |
| 2021/0201327 A1* | 7/2021 | Konig | H04M 3/5191 |
| 2021/0203784 A1* | 7/2021 | Konig | G06Q 30/01 |

\* cited by examiner

COMPLEX HUMAN-COMPUTER INTERACTIONS

FIELD OF TECHNOLOGY

This disclosure relates to leveraging machine-learning algorithms to improve chat interactions.

BACKGROUND OF THE DISCLOSURE

The disclosure is directed to tools for use in improving the efficiency and responses of a human chat responder.

When a customer initiates a chat session—i.e., an electronic communication session with a customer interacting typically with a live chat responder—it is important the customer receives timely and accurate responses.

One drawback of live chat interactions is that the chat responder is not necessarily aware of the state of mind of the chat initiator. Nor is the chat responder aware of any number of factors that are influencing the behavior, and/or the communication of the chat initiator, at the time of the chat. As such, the chat responder is limited in the accuracy and depth of his responses by the information provided during the chat.

It would be desirable for a chat responder to have access to the current psychological/emotional and/or physical state of the chat initiator at the time of the chat interaction.

It would be further desirable for a chat responder to draw on historical interactions with a pre-determined chat initiator in order to provide chat responses that are tailored, or tuned, to the chat initiator's historical profile.

It would be yet further desirable for a chat responder to be able to draw on historical interactions with a range of chat initiators in order to provide chat responses that are tailored, or tuned, specifically to subject matter contained in the chat initiator's message(s).

It would also be desirable to enable a chat responder to leverage Artificial Intelligence (AI) to access a Machine Learning (ML) library to provide historical context to the chat responder's responses.

It would be yet further desirable to enable a chat responder to increase the throughput of the chat responder's ongoing responses at least by electronically providing suggested responses to the chat initiator's queries.

SUMMARY OF THE DISCLOSURE

It is an object of the disclosure to provide the chat responder access to the current psychological/emotional and/or physical state of the chat initiator at the time of the chat interaction.

It is another object of the disclosure to provide the chat responder the ability to draw on historical interactions with a pre-determined chat initiator in order to provide chat responses that are tailored, or tuned, to the chat initiator's historical profile.

It is still another object of the disclosure to provide the chat responder the ability to be able to draw on historical interactions with a range of chat initiators in order to provide chat responses that are tailored, or tuned, specifically to subject matter of the chat initiator's messages.

It is yet another object of the disclosure to provide the chat responder the ability to leverage Artificial Intelligence (AI) to access a Machine Learning (ML) library to provide historical context to the chat responder's responses.

It is also an object of the disclosure to enable a chat responder to increase the throughput of the chat responder's ongoing responses at least by electronically providing suggested responses to the chat initiator's queries.

Systems for leveraging a plurality of machine-learning algorithms to improve a chat interaction are provided. A system according to the disclosure may include a monitor for detecting an initiation of a live chat session by a chat initiator.

The system according to certain embodiments, may also include an alert system for assigning a chat responder to the live chat session.

The system may also include a plurality of automated chat tools. Such tools may be used for providing suggestions to the chat initiator. Such suggestions may take the form of displayable dialogue, or other, boxes that include selected actionable information.

Such tools may be loaded or otherwise equipped with artificial intelligence (AI). Such chat tools may be configured to improve the response of a human chat responder during the live chat session.

The system may also include a machine learning (ML) library. The ML library may preferably be in electronic communication with the AI. The ML library may be configured to store historical information related to the initiator. The ML library may be configured to store historical information related to various chats, chat initiations, chat responses, and chat conditions. The ML library may be configured to tag historical information in such a way as to relate, for example, a chat response with one or more historical outcomes of the chat in which the response was submitted.

The system may include a chat responder screen. The chat responder screen may be configured to present, to the chat responder, selected actionable information. The selected actionable information is generated using the ML library as accessed by the chat tools, said selectable actionable information based at least in part on the historical information.

The system may also include a processor configured to integrate a plurality of chat responses. The plurality of chat responses may be generated by the chat responder. The processor may integrate the responses into the ML library. The processor may also be configured to integrate a plurality of chat comments. The chat comments may be generated by the chat initiator. The processor may be configured to integrate the chat comments into the ML library.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Methods for leveraging a plurality of machine-learning algorithms to improve a chat interaction is provided. A method may include monitoring for initiation of a live chat session by a chat initiator.

Once a live chat is initiated and detected by the monitoring, the method may further include alerting and assigning a chat responder to the live chat session. In addition to the alerting and assigning of the chat responder to the live chat session, the method may include engaging automated chat tools. The automated chat tools (referred to herein, in the alternative, as "auto-chat utilities") are preferably loaded with artificial intelligence (AI). The AI serves as a resource to improve the response of the human chat responder during the live chat session.

In some embodiments, the AI may access a machine learning (ML) library to draw relevant information therefrom and, preferably, provide information derived therefrom. Specifically, the AI may review and retrieve historical information related to the initiator.

Thereafter, the method may include presenting, on a chat responder screen, selected actionable information. The selected actionable information may preferably generated based on the historical information. The chat responder screen may preferably be located in proximity to the chat responder such that the chat responder can easily access the chat responder screen and any information that is presented thereon.

The method may, in some embodiments, further include integrating a plurality of chat responses into the ML library. Such responses may preferably include chat responses generated by the chat responder.

The method may also, in certain embodiments, include integrating, into the ML library, a plurality of chat comments. These chat comments may preferably be generated by the chat initiator.

As mentioned above, in certain embodiments, the method may include integrating a plurality of chat responses into the ML library. This integrating may include storing the chat responses. The storing of the chat responses may include defining a binary outcome of the chat and then, preferably, linking the chat responses with the binary outcome of the chat.

A binary outcome of the chat may be system-set or chat-responder-defined. For example, if a chat initiator sentiment, such as a sentiment defined in U.S. patent application Ser. No. 16/840,706, entitled, "CUSTOMER-SENTIMENT DRIVEN WORKFLOW BASED ON SOCIAL MEDIA DATA", which was filed on Apr. 6, 2020, and is hereby incorporated by reference herein in its entirety—is positive at the end of the chat, then the chat may be defined as positive. If the chat sentiment is negative at the end of the chat, then the chat may be defined as negative. Such a binary outcome of the chat may be understood to be one possible binary definition of the outcome of the chat. As such—a binarily defined outcome of the chat may be linked to one or more chat responses registered during the ongoing chat.

In some embodiments, integrating of a plurality of chat comments into the ML library may include storing the chat comments, defining a binary outcome of the chat and further linking the chat comments with the binary outcome of the chat. It should be noted that any suitable definition of the binarily defined outcome of the chat may be used within the scope of this disclosure.

Certain methods according to the embodiments may include splitting a display screen associated with a chat responder into smaller display screens. It should be noted that each of the smaller display screens may, in certain embodiments, be associated with a discrete, preferably ongoing, chat interaction.

Such a display screen may preferably enable a single chat responder to efficiently participate in numerous chat sessions substantially simultaneously. Such efficient participation in numerous chat sessions substantially simultaneously may be attributable to interplay between the chat-responder using the system and the AI. Because the AI can access the ML library, preferably in real-time, a chat responder can respond with AI-informed responses at a quicker pace than when the chat responder must formulate his or her own responses.

In some embodiments, the method may include retrieving and reviewing a plurality of artifacts from a social media account history and/or other third party data source. Preferably, the retrieval of the information includes retrieving information associated with a mobile device. The mobile device may be associated with, and preferably in a predetermined proximity of, the chat initiator. The method may preferably leverage the plurality of artifacts in order to tune the selected actionable information to a more relevant and timely chat response than would otherwise be possible if the sole resource for the response was the chat responder.

Certain methods, in accordance with the disclosure, may include using the plurality of artifacts to evaluate the current emotional, psychological and/or physical state of the chat initiator.

In some embodiments, the method may include retrieving a plurality of biometric conditions from a device upon which the chat initiator initiated the chat interaction. Such biometric conditions may be leveraged to tune the selected actionable information.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

Figure 1:
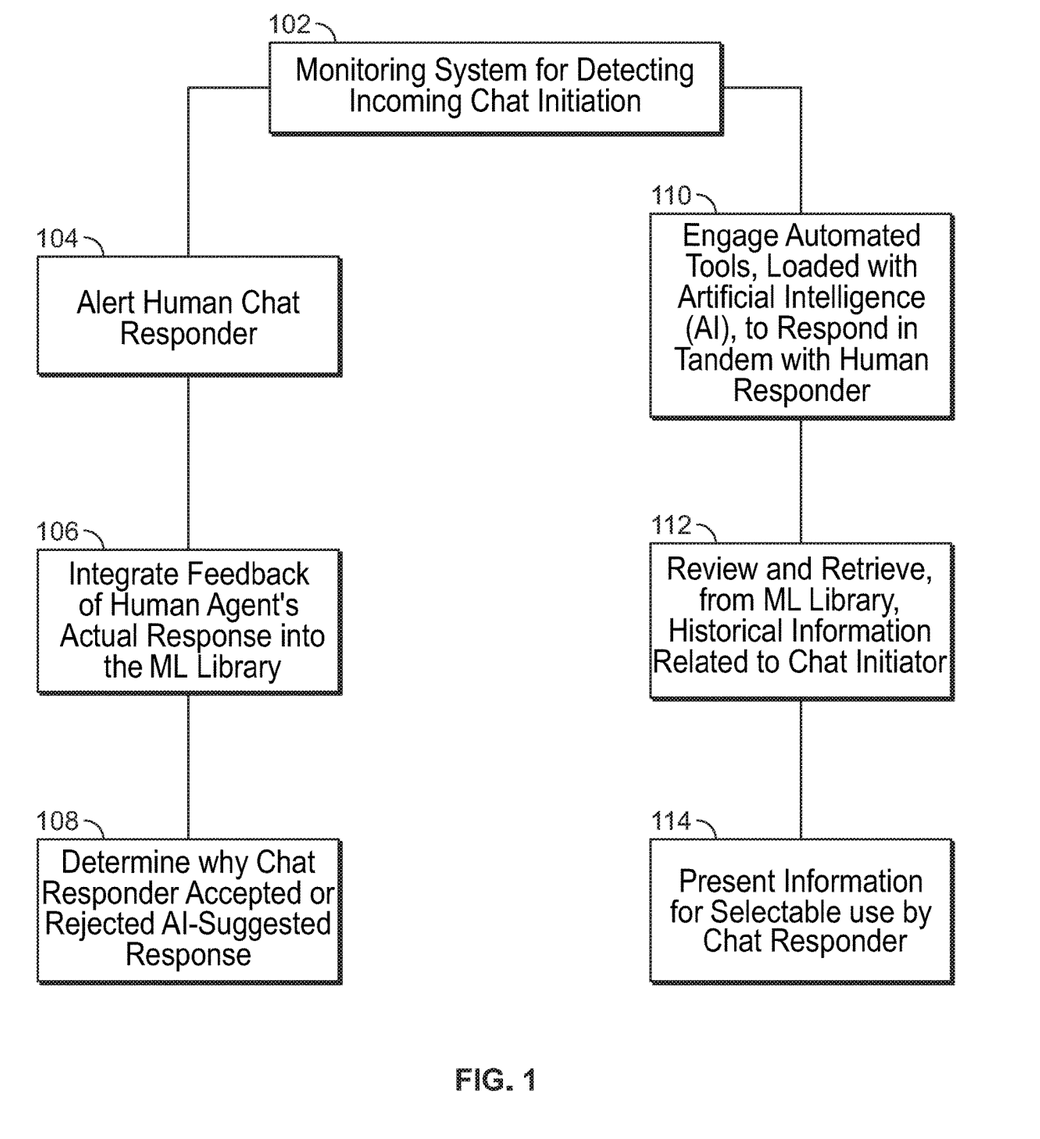
FIG. 1 shows an illustrative flow diagram of a method in accordance with the principles of the disclosure.

FIG. 1 shows an illustrative flow diagram of a method in accordance with the principles of the disclosure. Step 102 shows the step of using a monitoring system for detecting an incoming chat initiation.

In one branch of the response to the detection of the incoming chat initiation, step 104 shows alerting a human chat responder that to the incoming chat initiation detected in step 102. Along this same branch, step 106 shows integrating feedback of the responder's actual response into an ML library.

At step 108, this branch shows determining why the chat responder accepted or rejected an AI-suggested response. Such determining could be accomplished using feedback from the chat responder. Such feedback should preferably be limited to interaction with the chat responder which excludes the chat initiator.

The second branch flowing from step 102 shows engaging automated tolls, loaded with AI, to respond in tandem with the human chat responder, as shown at step 110. Step 112 shows, as part of this branch, reviewing and retrieving, from an ML library, historical information related to the chat initiator. Step 114 shows presenting retrieved information for selectable use by the chat responder.

Figure 2:
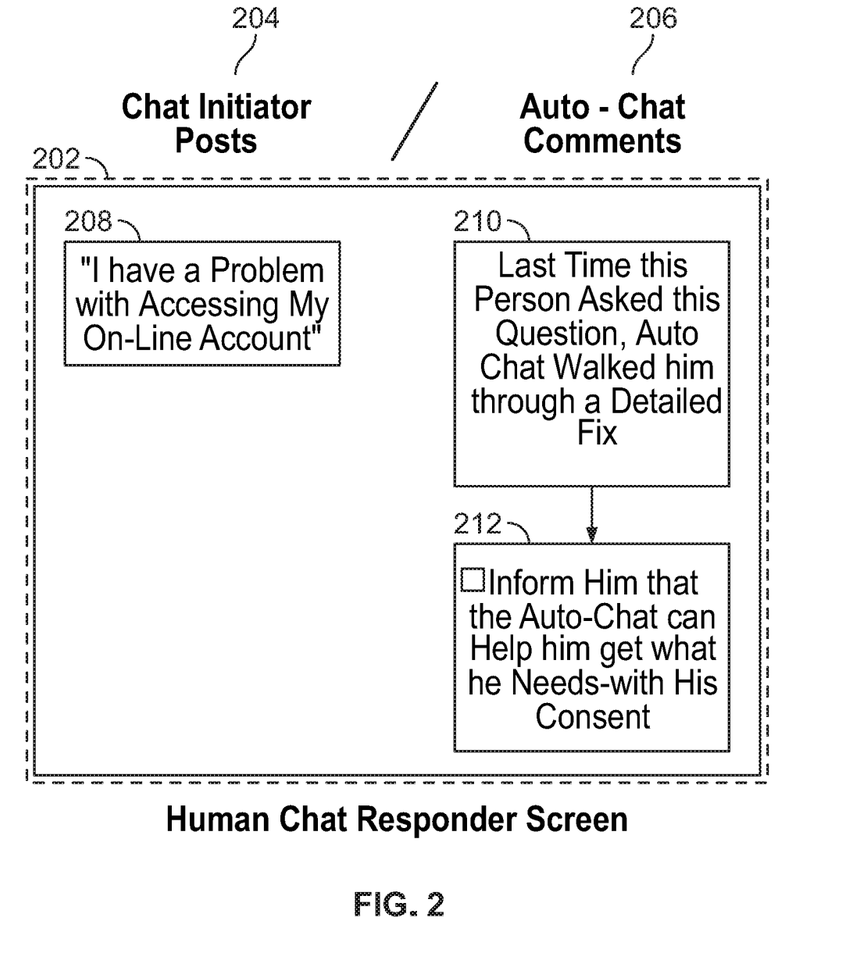
FIG. 2 shows an illustrative screen shot in accordance with principles of the disclosure.

FIG. 2 shows an illustrative screen shot 202 in accordance with principles of the disclosure. The screen shot includes two columns 204 and 206.

Column 204 shows the chat initiator posts. Column 206 shows auto-chat comments generated by one or more auto-chat utilities (not shown). Such utilities preferably use the AI to access the ML library. Such access may include retrieving appropriate, and historically-tested, responses to the chat initiator posts.

At 208, chat initiator posts show a chat initiator querying, "I have a problem with accessing my on-line account."

In response, at 210, the auto-chat comment column 206 shows that the last time this person asked this question, auto-chat tools walked him through a detailed fix of his account. Furthermore, at 212, auto-chat comments provide an on-screen selectable response to the chat responder. The on-screen selectable response, which preferably derives relevant information from historical exchanges either between the chat initiator and the chat system or between other chat initiators and the chat system, enables the human chat responder to select a preferably pre-authored chat response that informs the chat initiator that the auto-chat can help get what he needs—preferably providing the chat initiator consents to the auto-chat intervention.

Figure 3:
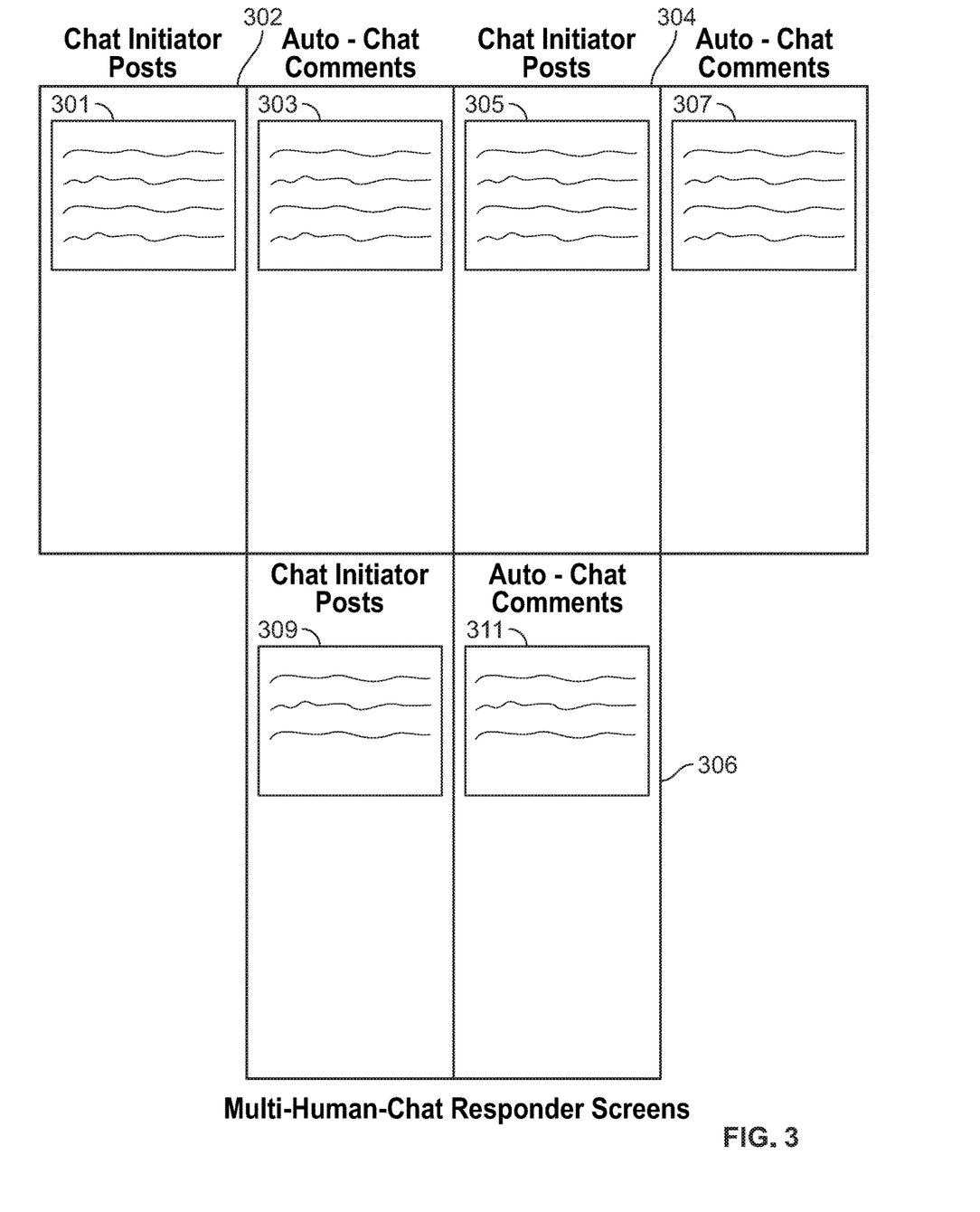
FIG. 3 shows illustrative multi-human-chat responder screens for use in accordance with principles of the disclosure.

FIG. 3 shows illustrative multi-human-chat responder screens 302, 304 and 306 for use in accordance with principles of the disclosure. Screen 302 preferably includes chat initiator posts 301 and auto-chat comments 303. Screen 304 preferably includes chat initiator posts 305 and auto-chat comments 307. Screen 306 preferably includes chat initiator posts 309 and auto-chat comments 311.

As noted above, such an auto-chat system preferably enables a chat responder to interact with a chat initiator in an efficient manor while saving resources associated with preparing and reviewing chat responses. It should be noted that, because the system according to the disclosure provides an efficient system which saves resources, it may enable a single chat responder to more efficiently handle multiple chats preferably simultaneously.

Figure 4:
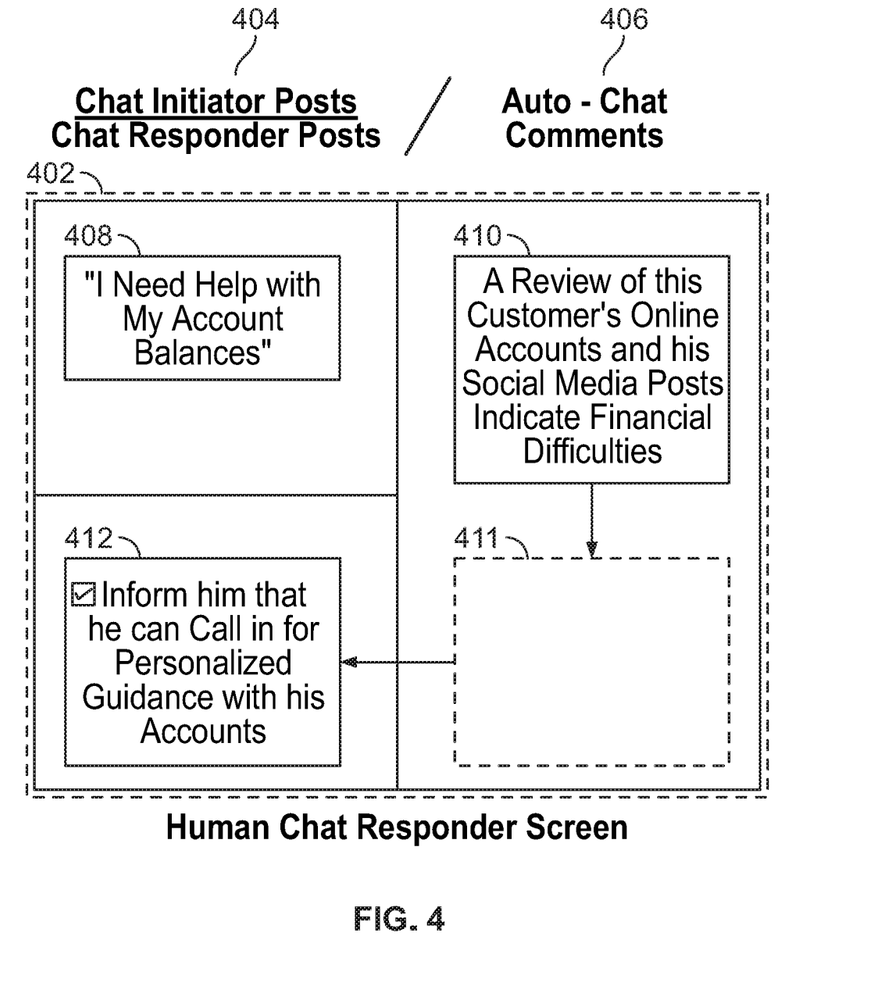
FIG. 4 shows another illustrative screen shot in accordance with principles of the disclosure.

FIG. 4 shows illustrative screen shot 402 in accordance with principles of the disclosure. Illustrative screen shot 402 preferably includes columns 404 and 406.

Chat column 404 shows chat initiator post 408 as well as chat responder post 412. Chat initiator post 408 shows a chat initiator stating, "I need help with my account balances."

At 410—auto-chat suggested comments column 406 shows, at 410, that a review of this customer's online accounts and his social media posts indicate financial difficulties. In such a case, the auto-chat facility has made an independent determination, based on facts outside the current chat interaction, regarding the sentiment of the chat initiator. Such determinations may use ML as accessed by the AI system. Such determinations may preferably inform the preparation and presentation of the selectable response.

Accordingly, auto-chat preferably presents an on-screen selectable response at 411. It should be noted that on-screen selectable response at 411 preferably includes, or is based on, the AI-derived information presented in step 410. It should be noted as well that on-screen selectable response at 411, or both auto-chat comments at 410 and on-screen selectable response at 411, may be displayed on human chat responder screen 402. When both auto-chat comments at 410 and on-screen selectable response at 411 are displayed on human chat responder screen 402, the human chat responder screen not only provides an on-screen selectable response at 411 but it also provides an understanding at 406 as to how the system arrived at, and the basis for, on-screen selectable response at 411.

It should be noted as well—that once a chat responder selects an auto chat-comment—it may be then be shifted from location 411 to the location of on-screen selected response 412. Such a displayed shift preferably visually indicates that the chat responder has selected on-screen selectable response 411, as indicated by check-mark in the box at the corner of the selected response at location 412. Therefore, on-screen selectable response 411 has been moved from the suggested column 406 over into an active chat column of the screen at 404 to display as selected response 412.

Figure 5:
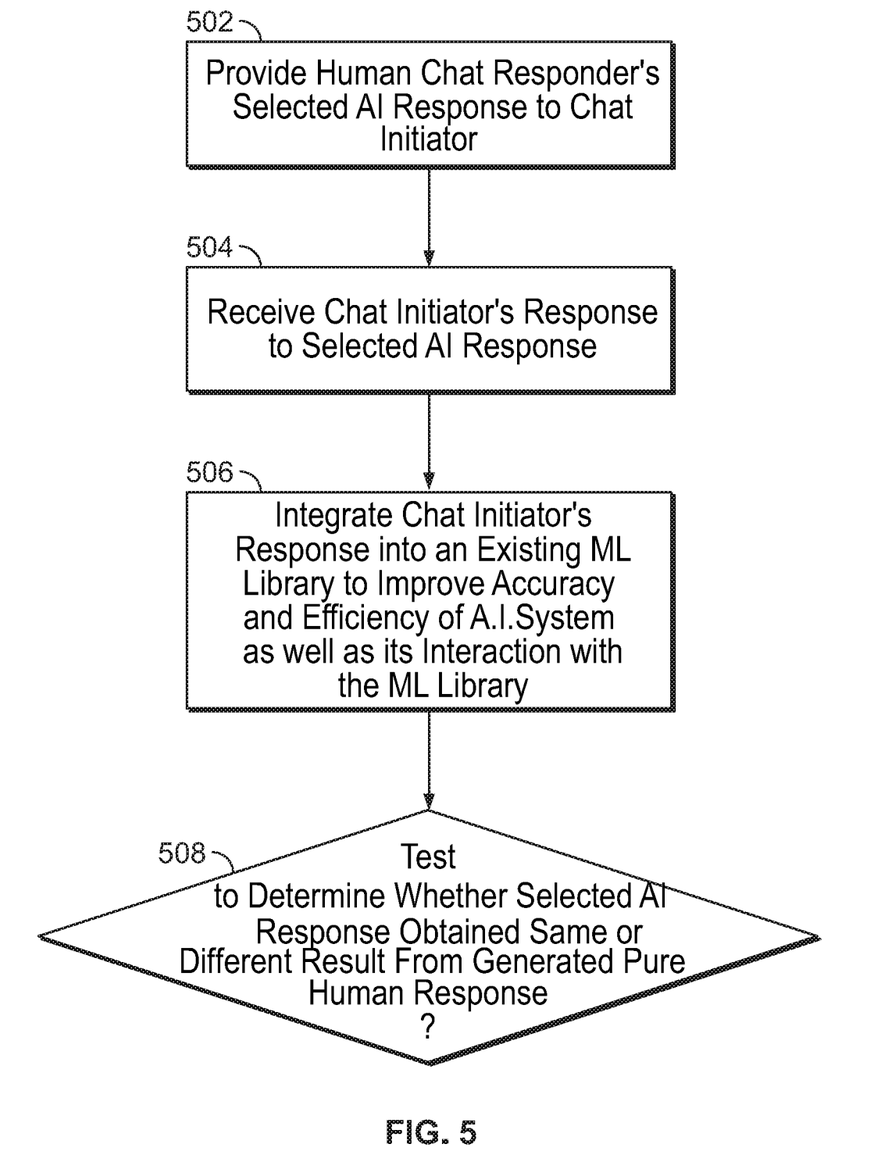
FIG. 5 shows yet another illustrative flow diagram of a method in accordance with the principles of the disclosure.

FIG. 5 shows yet another illustrative flow diagram of a method in accordance with the principles of the disclosure. Step 502 shows providing a human chat responder's selected artificial intelligence (AI) based response (or partially AI-based response) to a chat initiator. It should be noted that, in certain embodiments, step 502 could also relate to a situation where the system is providing a human chat responder's response that is generated by the responder and does not depend solely, or even partially, on the AI response.

Step 504 shows receiving the chat-initiator's response to the selected AI response. At 506, the diagram further shows integrating the chat initiator's response into an existing ML library to improve accuracy and efficiency of, and increase the stored information resident in, the ML library. It should be noted, and is generally known, that the more information stored in the ML library, the typically greater the possibility of a relevant and appropriate answer being returned.

Query 508 adds the additional concept of querying whether a selected AI response obtained the same or different result generated from a purely human response. This is useful for comparing the effect of a machine based response as opposed to the effect a human based response.

Thus, a disclosure relating to leveraging machine-learning algorithms to improve chat interactions is provided. Persons skilled in the art will appreciate that the present invention can be practiced by other than the described embodiments, which are presented for purposes of illustration rather than of limitation. The present invention is limited only by the claims that follow.

What is claimed is:

1. A method for leveraging a plurality of machine-learning algorithms to improve a chat interaction, the method comprising:
   monitoring for initiation of a live chat session by a chat initiator;
   alerting and assigning a chat responder to the live chat session;

engaging automated chat tools, said tools loaded with artificial intelligence (AI), in order to improve a response of the chat responder during the live chat session;

reviewing and retrieving, from a machine learning (ML) library, historical information related to the initiator;

presenting, on a chat responder screen, selected actionable historical information, said selected actionable information generated based on the historical information, to the chat responder;

integrating a plurality of chat responses, said plurality of chat responses generated by the chat responder, into the ML library; and integrating a plurality of chat comments, said chat comments generated by the chat initiator, into the ML library.

2. The method of claim 1 wherein the integrating a plurality of chat responses into the ML library comprises storing the chat responses, defining a binary outcome of the chat, and linking the chat responses with the binary outcome of the chat.

3. The method of claim 1 wherein the integrating a plurality of chat comments into the ML library comprises storing the chat comments, defining a binary outcome of the chat, and linking the chat comments with the binary outcome of the chat.

4. The method of claim 1 further comprising splitting a display screen associated with the chat responder into smaller display screens, each of the smaller display screens associated with a discrete chat interaction.

5. The method of claim 1 further comprising retrieving and reviewing a plurality of artifacts from a social media account history and/or other third party data source information associated with a mobile device, said device which is associated with the chat initiator, and leveraging the plurality of artifacts in order to tune the selected actionable information.

6. The method of claim 5 using the plurality of artifacts to evaluate the current emotional, psychological and/or physical state of the chat initiator.

7. The method of claim 1 further comprising retrieving a plurality of biometric conditions from a device with which the chat initiator initiated the chat interaction, and leveraging the plurality of biometric conditions to tune the selected actionable information.

8. A system for leveraging a plurality of machine-learning algorithms to improve a chat interaction, the system comprising:
a monitor for detecting an initiation of a live chat session by a chat initiator;
an alert system for assigning a chat responder to the live chat session;
a plurality of automated chat tools, said tools loaded with artificial intelligence (AI), said chat tools configured to improve a response of the chat responder during the live chat session;
a machine learning (ML) library, in electronic communication with the AI, said ML library configured to store historical information related to the initiator;
a chat responder screen configured to present, to the chat responder, selected actionable information, said selected actionable information generated using the ML library as accessed by the chat tools, said selectable actionable information based at least in part on the historical information; and
a processor configured to integrate a plurality of chat responses, said plurality of chat responses generated by the chat responder, into the ML library, said processor further configured to integrate a plurality of chat comments, said chat comments generated by the chat initiator, into the ML library.

9. The system of claim 8 wherein the processor is further configured to:
store the chat responses;
define a binary outcome of the chat, said defining based on a pre-determined set of criteria; and
link the chat responses with the binary outcome of the chat.

10. The system of claim 8 wherein the processor is further configured to:
store the chat comments;
define a binary outcome of the chat, said defining based on a pre-determined set of criteria; and
link the chat comments with the binary outcome of the chat.

11. The system of claim 8 wherein the chat responder screen displays a plurality of smaller display screens, each of the smaller display screens configured to display a discrete chat interaction.

12. The system of claim 8 wherein the processor further is configured to:
retrieve and review a plurality of artifacts from a social media account history and/or other third party data source information associated with a device associated with the chat initiator; and
to leverage the plurality of artifacts in order to tune the selected actionable information.

13. The system of claim 12 wherein the processor is configured to use the plurality of artifacts to evaluate the current emotional, psychological and/or physical state of the chat initiator.

14. The system of claim 8 wherein the processor ii further configured to:
retrieve a plurality of biometric conditions from a device with which the chat initiator initiated the chat interaction; and
leverage the plurality of biometric conditions to tune the selected actionable information.

15. A method for leveraging a plurality of machine-learning algorithms to improve a chat interaction, the method comprising:
monitoring for initiation of a live chat session by an initiator;
alerting and assigning a chat responder to the live chat session;
engaging automated chat tools, said tools loaded with artificial intelligence (AI), in order to improve a response of the chat responder during the live chat session;
reviewing and retrieving, said reviewing and retrieving using said AI, from a machine learning (ML) library in electronic communication with the AI, historical information;
presenting, on a chat responder screen, selected actionable historical information, said selected actionable information generated based on the historical information, to the chat responder;
integrating, based on a plurality of pre-determined conditions, a plurality of chat responses, said plurality of chat responses generated by the chat responder, into the ML library; and integrating, based on a plurality of pre-determined conditions, a plurality of chat comments, said chat comments generated by the chat initiator, into the ML library.

16. The method of claim 15 wherein the integrating a plurality of chat responses into the ML library comprises storing the chat responses, defining a binary outcome of the chat and linking the chat responses with the binary outcome of the chat.

17. The method of claim 15 wherein the integrating a plurality of chat comments into the ML library comprises storing the chat comments, defining a binary outcome of the chat and linking the chat comments with the binary outcome of the chat.

18. The method of claim 15 further comprising splitting a display screen associated with the chat responder into smaller display screens, each of the smaller display screens associated with a discrete chat interaction.

19. The method of claim 15 further comprising retrieving and reviewing a plurality of artifacts associated with a device which is associated with the chat initiator, and leveraging the plurality of artifacts in order to tune the selected actionable information.

20. The method of claim 19 using the plurality of artifacts to evaluate the current emotional, psychological and/or physical state of the chat initiator.

21. The method of claim 15 further comprising retrieving a plurality of biometric conditions from a device with which the chat initiator initiated the chat interaction, and leveraging the plurality of biometric conditions to tune the selected actionable information.

* * * * *